P. HARDMAN.
STOP MECHANISM FOR MEASURING APPARATUS.
APPLICATION FILED OCT. 9, 1917.
1,276,525.
Patented Aug. 20, 1918.
2 SHEETS—SHEET 1.
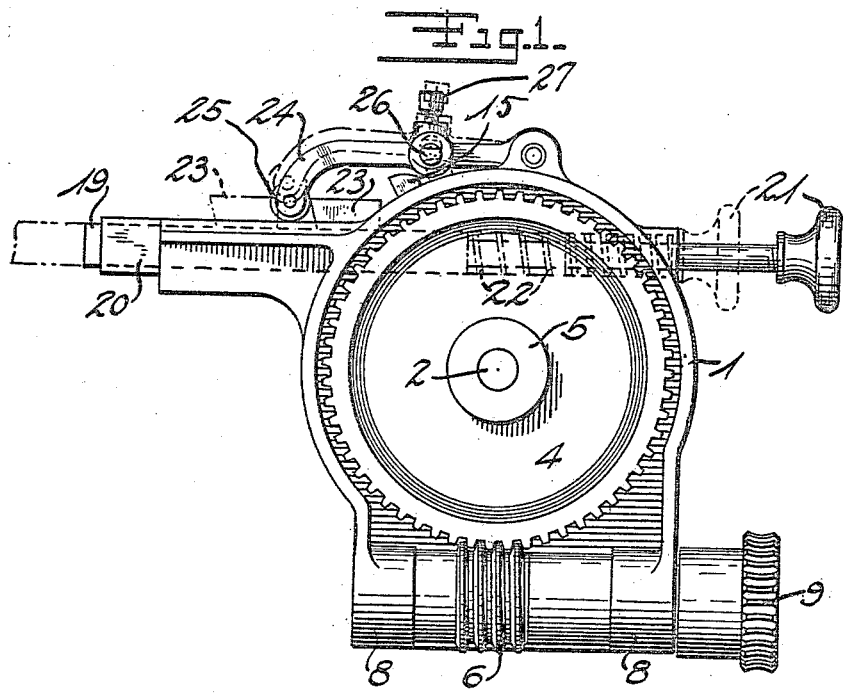
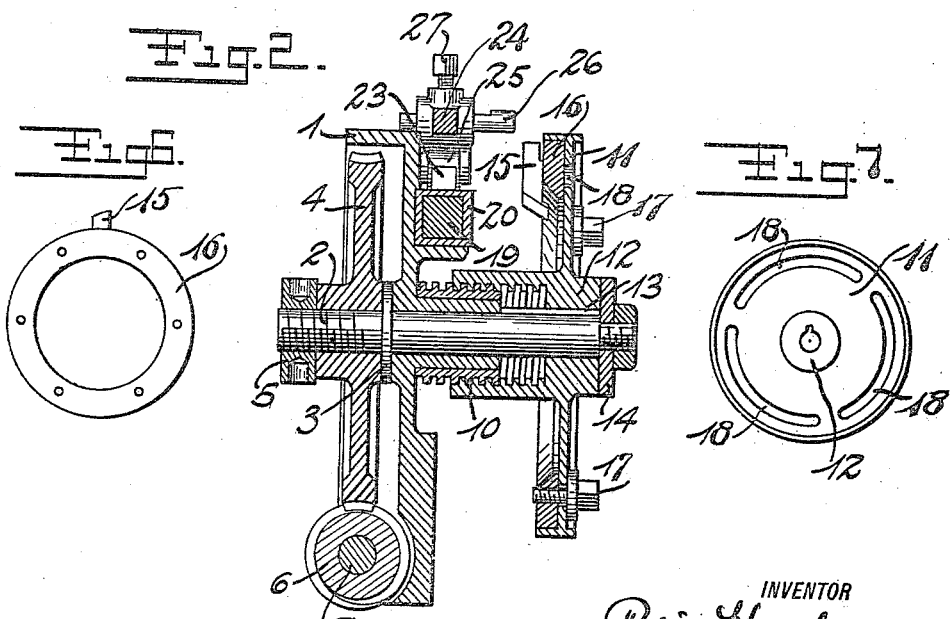
INVENTOR
Peter Hardman
BY
Mitchell & Allen
ATTORNEY P. HARDMAN.
STOP MECHANISM FOR MEASURING APPARATUS.
APPLICATION FILED OCT. 9, 1917.
1,276,525.
Patented Aug. 20, 1918.
2 SHEETS—SHEET 2.
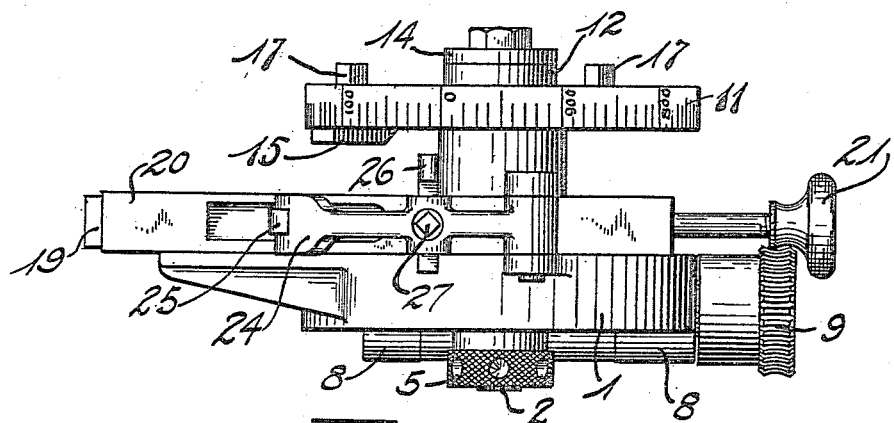
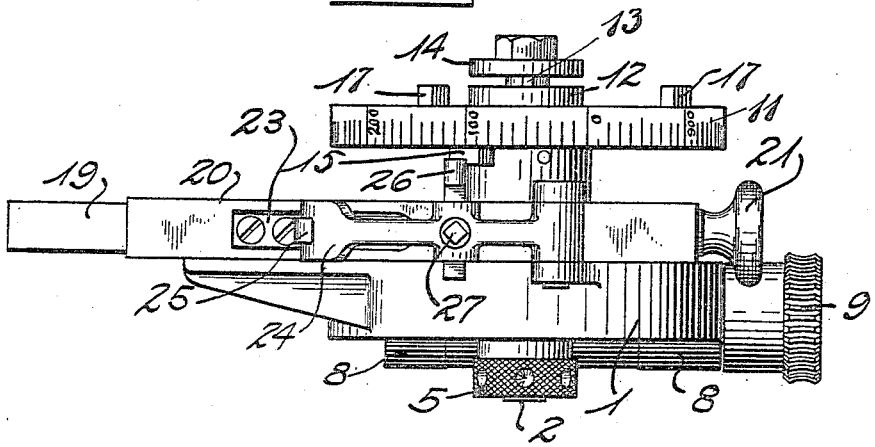
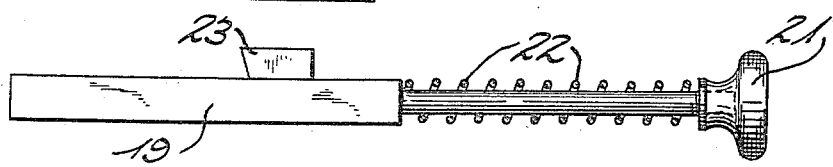
INVENTOR
Peter Hardman
BY
Mitchell T Allen
ATTORNEY

UNITED STATES PATENT OFFICE.

PETER HARDMAN, OF WILLIMANTIC, CONNECTICUT, ASSIGNOR TO AMERICAN THREAD COMPANY, OF NEW YORK, N. Y., A CORPORATION OF NEW JERSEY.

STOP MECHANISM FOR MEASURING APPARATUS.

1,276,525.

Specification of Letters Patent.

Patented Aug. 20, 1918.

Application filed October 9, 1917. Serial No. 195,642.

*To all whom it may concern:*

Be it known that I, PETER HARDMAN, a citizen of the United States of America, residing at Willimantic, Windham county, Connecticut, have invented a new and useful Stop Mechanism for Measuring Apparatus, of which the following is a specification.

My invention relates to stop mechanism for measuring apparatus which may be successfully employed with machines used for making thread, cord, fabric, or any material that is to be measured whereby, when any predetermined length of the product has been produced, the machine will be caused to stop or the product severed, as desired. In a broad sense, therefore, the invention might be characterized as a measuring machine. The object of the invention is to provide a simple, effective and accurate means for accomplishing the above referred to result. Inasmuch as the invention may be applied to any machine used for the above purpose, it is unnecessary to illustrate such a machine since the novelty in my invention resides in the attachment therefor.

In the drawings:

Figure 1 is a side elevation of my new and improved apparatus.

Fig. 2 is in the main a vertical cross section through the center of Fig. 1.

Fig. 3 is a plan view showing the parts in one position.

Fig. 4 is a similar view showing the parts in another position.

Fig. 5 illustrates a detail of construction.

Fig. 6 illustrates another detail on a reduced scale.

Fig. 7 is a similar view of another detail.

1 represents a frame or housing. 2 is a shaft which passes through the center of the housing as best seen in Fig. 2. This shaft 2 carries a fixed collar 3. 4 is a wheel mounted on the shaft 2 outside of the collar 3. 5 is a nut on the shaft 2 by which the wheel 4 may be clamped tightly against the collar 3 so that when the wheel 4 is rotated the shaft 2 will be driven, and when the nut is loose the shaft 2 may be freely turned. The wheel 4 may be rotated by any suitable means such as a worm gear 6 mounted on shaft 7 which has suitable bearings 8—8 on the frame 1. The shaft 7 is driven by the machine to which the measuring attachment is to be applied, a worm gear connection 9 being shown. On the opposite side of the frame 1 from the wheel 4 is fixed a threaded boss 10 through which the shaft 2 concentrically passes. 11 is a measuring wheel having a hub 12 which is internally threaded so that it will screw onto the threaded boss 10. 13 is a spline on that part of the shaft 2 within the hub 12, and the hub 12 has a slot which freely receives said spline 13 so that the wheel 11 will slide to and fro on the shaft 2, through the action of the threaded boss 10, when the wheel 11 is turned by said shaft 2 and thus said wheel 11 has a compound movement. 14 is a stop on the outer end of the shaft 2 which limits the outward movement of the wheel 11 thereon. The wheel 11 is provided with a graduated periphery. 15 is a cam carried by a ring 16 rotatably mounted on the inner side of the wheel 11 and held by bolts 17 which pass through slots 18 in the web of the wheel 11 whereby said ring and cam 15 may be adjusted angularly to any extent on the wheel 11. 19 is a spring projected plunger which may be termed a knock-off member and which is mounted to reciprocate in a suitable guide-way 20 in the frame 1. The rear end of the plunger 19 may have a handle 21 by which the plunger 19 may be retracted against the tension of the spring 22, indicated in dotted lines at 22. 23 is a shoulder on the top of the plunger 19, said shoulder projecting through a slot in the upper part of the guide-way 20. 24 is a latch which preferably has an anti-friction roller 25 at its forward end, the rear end of the latch being pivoted to the frame 1. When the plunger 19 is retracted, as shown in solid lines of Fig. 1 and Fig. 3, the latch 24 will engage the shoulder 23. In this instance the center of the anti-friction roll drops below the upper edge of the shoulder 23, which is slightly undercut as shown, so as to hold the plunger retracted. When the latch is lifted obviously the plunger 19 will be released and will be projected forwardly by the spring 22. It is this forward projection of the plunger 19 that may be utilized in any suitable way to stop the machine with which the attachment is associated, or to sever the thread, cord, fabric or whatever product is being measured. The latch 24 is tripped in the following manner: 26 is a nose projecting laterally from the latch 24, the same being preferably adjustable so as to be projected to any desired extent. 27 is a lock screw by which the nose may be held in its adjusted position.

Operation: In the apparatus as actually shown, the wheel is graduated so as to measure for example 1000 yards to each revolution thereof, the graduations being numbered 0, 100, 200 and so on, up to 900, the zero mark indicating 1000 when the wheel has made one complete revolution. The stop 14 should be so adjusted that when the wheel 11 has been turned outward to its extreme limit, at which point it is checked by said stop, the zero mark will line up with the nose 26 on the latch, see Fig. 3. If now it is desired to measure say 1100 yards, the cam 15 is adjusted so that it will stand adjacent to the graduation 100, and the nose 26 is adjusted so that the wheel 11 may make one complete revolution before it will be drawn-in sufficiently on the threaded boss to cause the cam 15 to strike the nose 26. When, however, the wheel 11 has been rotated one and one-tenth revolutions, the wheel 11 will be drawn-in to such an extent that the said cam 15 will strike the nose 26, as shown in Fig. 3, lifting the latch 24 and freeing the plunger 19 so that the latter will be projected ahead to perform its knock-off or cutting-off function. After this has occurred the parts may be reset to the position shown in Fig. 3 and the operation may be repeated. If it is desired to measure anything less than 1000 yards, the cam 15 should be adjusted adjacent to the graduation on wheel 11 indicating the desired length and then the nose 26 should be moved out so that a partial revolution of the wheel 11 will cause the cam 15 to engage the nose 26 and release the latch. From the foregoing, it will be seen that any machine with which the measuring apparatus is associated may be controlled after it has produced any particular length of the product it is turning out or handling.

It should be understood that I have shown my improved attachment only in one preferred or practical form and that it is susceptible of a wide variety of modifications without departure from the spirit or scope of my invention.

I claim:

1. In a machine of the character described, a knock-off device, a shaft, a member carried thereby having a rotating movement and a side movement, a latch for engaging the knock-off member and means carried by the aforesaid member for releasing the latch when said member has moved a predetermined distance.

2. In a machine of the character described, a spring projected knock-off device, a latch for holding said member retracted, releasing mechanism for said latch comprising a shaft and means slidably mounted upon and rotatable by said shaft for releasing said latch when said shaft has turned a predetermined distance.

3. In a machine of the character described, a movable knock-off device, means for moving the same into an operative position, means for holding the same in a non-operative position, a shaft and means slidably mounted upon and rotatable by the shaft for releasing said holding means for the knock-off device when said shaft has turned a predetermined distance.

4. In a machine of the character described, a movable knock-off device, means for moving the same into an operative position, means for holding the same in a non-operative position, a shaft and means slidably mounted upon and rotatable by the shaft for releasing said holding means for the knock-off device when said shaft has turned a predetermined distance, said means actuated by the shaft including an adjustable cam.

5. In a machine of the character described, a knock-off device, a shaft, a member carried thereby having a rotating movement and a side movement, a latch for engaging the knock-off member and means carried by the aforesaid member for releasing the latch when said member has moved a predetermined distance, and adjustable means carried by the latch for coöperating with the member carried by the shaft.

6. In a machine of the character described, a knock-off device with means for projecting the same into an operative position, a latch for holding the same in a retracted position, a shaft, a member slidable thereon and rotated thereby, means for moving said member longitudinally on said shaft while the latter is rotated, and means carried by said member for releasing said latch from said knock-off device when said member has been moved a predetermined distance.

7. In a machine of the character described, a knock-off device with means for projecting the same into an operative position, a latch for holding the same in a retracted position, a shaft, a member slidable thereon and rotated thereby, means for moving said member longitudinally on said shaft while the latter is rotated, and means carried by said member for releasing said latch from said knock-off device when said member has been moved a predetermined distance, said means including a cam adjustably mounted on said member.

8. In a machine of the character described, a knock-off device with means for projecting the same into an operative position, a latch for holding the same in a retracted position, a shaft, a member slidable thereon and rotated thereby, means for moving said member longitudinally on said shaft while the latter is rotated, and means carried by said member for releasing said latch from said knock-off device when said member has been moved a predetermined distance, said means including a cam adjustably mounted on said member, and a nose on said latch for engagement by said cam.

9. In a machine of the character described, a knock-off device with means for projecting the same into an operative position, a latch for holding the same in a retracted position, a shaft, a member slidable thereon and rotated thereby, means for moving said member longitudinally on said shaft while the latter is rotated, and means carried by said member for releasing said latch from said knock-off device when said member has been moved a predetermined distance, said means including a cam adjustably mounted on said member, and an adjustable nose on said latch for engagement by said cam.

10. In a machine of the character described, a knock-off device, a shaft, a support therefor having a screw threaded boss concentric with the shaft, a measuring wheel having a screw threaded hub mounted on said boss, a spline connection between said wheel and shaft whereby the rotation of the latter will cause a combined rotative and side movement of said wheel, a latch for engaging the knock-off member to hold it in one position, and means carried by said wheel to disengage said latch when said wheel has moved a predetermined distance.

11. In a machine of the character described, a knock-off device, a shaft, a relatively stationary screw threaded element concentric to said shaft, a measuring wheel having a screw threaded hub engaged with said relatively stationary screw threaded member, a spline connection between said wheel and shaft, whereby the rotation of the latter will produce a combined rotative and sidewise movement of said wheel, a latch for engaging the knock-off member and means carried by said wheel for causing said latch to release the knock-off member when the wheel is moved a predetermined distance.

12. In a machine of the character described, a knock-off device, a shaft, a relatively stationary screw threaded element concentric to said shaft, a measuring wheel having a screw threaded hub engaged with said relatively stationary screw threaded member, a spline connection between said wheel and shaft, whereby the rotation of the latter will produce a combined rotative and sidewise movement of said wheel, a latch for engaging the knock-off member and coöperating means carried by the wheel and latch for engagement after a predetermined movement of the wheel to release the latch from the knock-off member, said means being relatively adjustable for the purpose of varying the point at which the latch will be operated.

13. In a machine of the character described, a knock-off device, a shaft, a support therefor having a screw threaded boss concentric with the shaft, a measuring wheel having a screw threaded hub mounted on said boss, a spline connection between said wheel and shaft whereby the rotation of the latter will cause a combined rotative and side movement of said wheel, a latch for engaging the knock-off member to hold it in one position, and means carried by said wheel to disengage said latch when said wheel has moved a predetermined distance, the last mentioned means being adjustable relatively to said wheel and said latch.

PETER HARDMAN.

Copies of this patent may be obtained for five cents each, by addressing the "Commissioner of Patents, Washington, D. C."